Patented Feb. 20, 1940

2,191,196

UNITED STATES PATENT OFFICE 2,191,196

REFRIGERANTS AND METHODS OF TRANSFERRING HEAT

Joseph Fleischer, Godfrey Township, Madison County, Ill., assignor, by mesne assignments, to General Motors Corporation, Dayton, Ohio, a corporation of Delaware No Drawing. Original application April 30, 1932, Serial No. 608,574. Divided and this application February 4, 1937, Serial No. 124,031

3 Claims. (Cl. 62—178)

This application is a division of my copending application, Serial No. 608,574, filed April 30, 1932, now matured into Patent No. 2,101,993, issued Dec. 14, 1937.

This invention relates to chemistry and more particularly to refrigerants and the art of transferring heat from one point to another point.

Heretofore refrigerant mixtures have been provided for the alleged purpose of combining the beneficial properties of each refrigerant while at the same time eliminating the undesirable properties of each refrigerant. These mixtures have not been commercially practicable for the reason that no refrigerant mixture, as far as I am aware, has been used that boils at a constant temperature. On the other hand, fractionation has always occurred heretofore in such mixtures resulting in higher head or condenser pressures with lower evaporator pressures necessay in the system and hence a material loss in efficiency in operation.

My invention has for its objects to provide mixtures of two or more refrigerants forming azeotropic mixtures, which mixtures boil at a constant temperature as if the mixture were composed of but a single subtsance.

When an azeotropic mixture is employed as a refrigerant, no fractionation occurs and therefore there is no loss in efficiency resulting therefrom on account of the resulting higher head or condenser pressures and necessarily lower evaporator pressures. The advantages of such a mixture are obvious for it is possible by employing such a mixture to reduce the undesirable properties of one or both of the refrigerants such as reducing the flammability of the refrigerant or even entirely eliminating the flammability as well as to reduce the toxicity of the refrigerant and also the corrosive effect thereof. Such azeotropic mixtures also make it possible to provide a different boiling point and different evaporating and condensing pressures while at the same time retaining the advantageous features of certain refrigerants such as that of low cost.

One of the mixtures I have found to be advantageous is that of sulphur dioxide and dimethyl ether. Although sulphur dioxide has a boiling point of 13.5° F. and dimethyl ether has a boiling point of —12.5° F., I find that when these liquids, sulphur dioxide and dimethyl ether are mixed in the proportions of approximately 65 to 35 by weight, an azeotropic mixture is formed having a constant boiling point of 32.5° F. This therefore provides a mixture with a higher boiling point. This mixture has the advantage of being exceedingly non-corrosive, stable and much less flammable than dimethyl ether alone. This mixture also has the advantage of being low in cost.

Another mixture I have found to be advantageous is that of dichloro-tetra-fluoro-ethane and butane in the proportions of approximately 59 to 41 by weight. This forms an azeotropic mixture having a boiling point of approximately 28° F. Among the advantageous properties of this mixture are that it is a highly efficient refrigerant for compression refrigerating systems since it has a very high latent heat and that it retains most of the valuable properties of the fluorine refrigerants, yet is materially lower in cost.

Another example of such a mixture is that of trichloro-mono-fluoro-methane and methyl formate in the proportions of 82 to 18 by weight which forms an azeotropic mixture having a constant boiling point of 68° F. This mixture has the advantage of being non-inflammable, non-toxic, and stable. This mixture has a lower boiling point than trichloro-monofluoro-methane which is the lowest in cost of any of the fluorine refrigerants but which has the objection of having a boiling point too high for ordinary purposes. This mixture therefore has the advantages of trichloro-monofluoro-methane and, in addition, has a lower boiling point and is lower in cost.

Another example is that of trichloro-monofluoro-methane and acetaldehyde in the proportions of 55 to 45 by weight which forms an azeotropic mixture having a constant boiling point of 60° F.

What is claimed is as follows:

1. The process of transferring heat which comprises evaporating an azeotropic mixture of a halofluoro-derivative of an aliphatic hydrocarbon and butane, and condensing the evaporated azeotropic mixture.

2. The process of transferring heat which comprises evaporating an azeotropic mixture of dichloro-tetrafluoro-ethane and butane, and then condensing the evaporated azeotropic mixture.

3. A refrigerant for refrigerating apparatus comprising an azeotropic mixture of dichloro-tetrafluoro-ethane and butane.

JOSEPH FLEISCHER.